United States Patent
Neubrand

(10) Patent No.: US 7,959,208 B2
(45) Date of Patent: Jun. 14, 2011

(54) CONVERTIBLE TOP WITH IN-FOLDING SIDE RAILS

(75) Inventor: Frank Neubrand, West Bloomfield, MI (US)

(73) Assignee: Wilhelm Karmann GmbH, Osnabruck (DE)

(*) Notice: Subject to any disclaimer, the term of this patent is extended or adjusted under 35 U.S.C. 154(b) by 118 days.

(21) Appl. No.: 12/341,922

(22) Filed: Dec. 22, 2008

(65) Prior Publication Data

US 2010/0156136 A1    Jun. 24, 2010

(51) Int. Cl.
B60J 7/00 (2006.01)
(52) U.S. Cl. .................................. 296/107.16
(58) Field of Classification Search ............. 296/107.16, 296/107.01, 107.09, 107.07, 108, 121, 122, 296/146.14
See application file for complete search history.

(56) References Cited

U.S. PATENT DOCUMENTS

| | | | | |
|---|---|---|---|---|
| 2,434,332 A | | 1/1948 | Olivier et al. | |
| 3,473,842 A | * | 10/1969 | Glossop, Jr. et al. | 296/116 |
| 4,573,732 A | * | 3/1986 | Muscat | 296/108 |
| 5,004,291 A | * | 4/1991 | Bauer et al. | 296/116 |
| 5,620,226 A | * | 4/1997 | Sautter, Jr. | 296/107.08 |
| 5,645,309 A | * | 7/1997 | Graf | 296/121 |
| 5,667,269 A | * | 9/1997 | Prenger et al. | 296/107.09 |
| 6,039,382 A | * | 3/2000 | Mather et al. | 296/107.01 |
| 6,048,021 A | * | 4/2000 | Sautter, Jr. | 296/117 |
| 6,139,087 A | * | 10/2000 | Wolfmaier et al. | 296/107.16 |
| 6,237,986 B1 | * | 5/2001 | Neubrand et al. | 296/107.01 |
| 6,325,446 B1 | * | 12/2001 | Wuellrich et al. | 296/107.12 |
| 6,409,247 B1 | * | 6/2002 | Maass | 296/107.13 |
| 6,464,284 B2 | * | 10/2002 | Neubrand | 296/107.01 |
| 6,485,094 B2 | | 11/2002 | Corder et al. | |
| 6,550,842 B1 | * | 4/2003 | Halbweiss et al. | 296/116 |
| 6,578,898 B2 | * | 6/2003 | Rothe et al. | 296/107.07 |
| 6,692,061 B1 | * | 2/2004 | Willard | 296/116 |
| 6,722,724 B1 | * | 4/2004 | MacFarland | 296/107.17 |
| 6,793,267 B2 | * | 9/2004 | Hesselhaus | 296/107.12 |
| 6,802,554 B1 | * | 10/2004 | Just et al. | 296/107.09 |
| 6,957,842 B1 | * | 10/2005 | Garska | 296/107.12 |
| 7,032,951 B2 | * | 4/2006 | Powell | 296/107.01 |
| 7,104,587 B2 | * | 9/2006 | MacNee et al. | 296/121 |
| 7,118,160 B2 | * | 10/2006 | Willard | 296/107.01 |
| 7,118,161 B2 | * | 10/2006 | Neubrand | 296/107.15 |
| 7,232,177 B2 | * | 6/2007 | Wagner | 296/107.17 |
| 7,246,841 B2 | * | 7/2007 | Dilluvio | 296/107.09 |
| 7,275,783 B2 | * | 10/2007 | Dilluvio | 296/107.09 |
| 7,287,801 B2 | * | 10/2007 | Harrison et al. | 296/107.09 |
| 7,300,095 B2 | * | 11/2007 | Rawlings et al. | 296/116 |
| 7,334,831 B2 | * | 2/2008 | Wezyk et al. | 296/107.09 |
| 7,341,303 B2 | * | 3/2008 | MacNee et al. | 296/121 |

(Continued)

FOREIGN PATENT DOCUMENTS

DE    943747    6/1956

(Continued)

*Primary Examiner* — Kiran B. Patel
(74) *Attorney, Agent, or Firm* — Gifford, Krass, Sprinkle, Anderson & Citkowski, P.C.

(57) ABSTRACT

A convertible soft top for a motor vehicle is provided. The convertible soft top has a front portion and a rear portion. The front portion has a header element that can attach to a frame around a front window of the motor vehicle and a pair of in-folding side rails. The in-folding side rails afford for the length of the front portion to be reduced and allow for the front portion to be stored on top of the rear portion in a clam shell configuration.

12 Claims, 6 Drawing Sheets

U.S. PATENT DOCUMENTS

| | | | |
|---|---|---|---|
| 7,347,482 B2* | 3/2008 | Powell | 296/107.08 |
| 7,380,863 B2* | 6/2008 | Garska | 296/107.12 |
| 7,497,498 B2* | 3/2009 | Theuerkauf | 296/107.09 |
| 7,517,000 B2* | 4/2009 | Liedmeyer et al. | 296/107.09 |
| 7,644,974 B2* | 1/2010 | Theuerkauf | 296/107.16 |
| 7,690,716 B2* | 4/2010 | Dilluvio | 296/107.09 |
| 2003/0057728 A1* | 3/2003 | Sims | 296/107.08 |
| 2007/0063531 A1* | 3/2007 | Wezyk et al. | 296/107.09 |
| 2007/0138828 A1* | 6/2007 | Wagner | 296/108 |
| 2007/0170750 A1* | 7/2007 | Just et al. | 296/121 |
| 2007/0194595 A1* | 8/2007 | Papendorf | 296/107.01 |
| 2007/0222254 A1* | 9/2007 | Wagner | 296/108 |
| 2008/0258491 A1* | 10/2008 | Just et al. | 296/108 |
| 2008/0284200 A1* | 11/2008 | Dilluvio et al. | 296/107.09 |
| 2009/0085369 A1* | 4/2009 | Willard et al. | 296/107.01 |
| 2009/0224568 A1* | 9/2009 | Dilluvio et al. | 296/112 |
| 2010/0013264 A1* | 1/2010 | Willard et al. | 296/107.08 |
| 2010/0109375 A1* | 5/2010 | Just et al. | 296/122 |
| 2010/0230998 A1* | 9/2010 | Willard et al. | 296/146.14 |

FOREIGN PATENT DOCUMENTS

| | | |
|---|---|---|
| DE | 19731330 | 2/1999 |
| DE | 19956482 | 3/2001 |
| GB | 448720 | 6/1936 |

* cited by examiner

CONVERTIBLE TOP WITH IN-FOLDING SIDE RAILS

FIELD OF THE INVENTION

The present invention is related to a convertible top, and in particular to a convertible top having in-folding side rails.

BACKGROUND OF THE INVENTION

Convertible tops for motor vehicles are known. In addition, convertible tops having a "soft top", also known as a "convertible soft top" or a "soft top convertible", are known wherein a fabric cover extends across and between a pair of lateral frame parts that extend in a longitudinal direction of the vehicle and bows that extend transversely from one lateral frame part to the other lateral frame part. In this manner, a frame is provided that supports the fabric cover and affords a top for a passenger compartment.

Convertible tops are also designed to be placed in a retracted position, for example a folded package that can be stored behind the passenger compartment. However, heretofore soft convertible tops have required complicated bending and folding mechanisms in order to provide a compact package to be stored behind the passenger compartment. In the alternative, less complicated folding mechanisms have resulted in folded packages that are not space efficient when placed behind the passenger compartment. As such, a soft convertible top that provides for a space efficient retracted storage package and uses simple bending and folding mechanisms would be desirable.

SUMMARY OF THE INVENTION

A convertible soft top for a motor vehicle is provided. The convertible soft top has a front portion and a rear portion. The convertible soft top has and is moveable between an extended position and a retracted position. The front portion has a header element that can attach to a frame around a front window of the motor vehicle and a pair of in-folding side rails. Each of the in-folding side rails has a front rail and a rear rail, the front rail having a front end that is pivotally attached to the header element and a rear end that is pivotally attached to the rear rail. The rear rail has a front end that is pivotally attached to the front rail and a rear end that is pivotally attached to the rear portion. The rear end of the front rail can be pivotally attached to the front end of the rear rail with an in-folding pivot joint.

The in-folding pivot joint affords for the adjacent ends of the front rail and the rear rail attached to each other by the in-folding pivot joint to move towards a center line plane and thus results in the length of the front portion being reduced. As such, the front rail and the rear rail of each in-folding side rail are operable to fold inwardly towards the center line plane of the convertible soft top. In addition, the front portion can also have a plurality of bows and a fabric cover, the plurality of bows being generally parallel to each other and transverse to the center line plane of the top. The plurality of bows are also pivotally attached to each of the pair of in-folding side rails and the fabric cover extends across and is attached to the bows. In some instances, the plurality of bows is at least three bows.

The rear portion has a four bar linkage and a connecting link between the four bar linkage and the front portion, the front portion and the rear portion operable to fold into a clamshell configuration with the front portion located on top of the rear portion. With the in-folding side rails, the plurality of bows remain generally parallel to each other with a distance between each bow decreasing as the convertible soft top moves from the extended position to the retracted position. With the decrease in distance between the bows, the front portion is compacted into a package the fits on top of the rear portion when the top is in the retracted position. In this manner, a compact space efficient convertible soft top is provided.

DETAILED DESCRIPTION OF THE INVENTION

Figure 1:
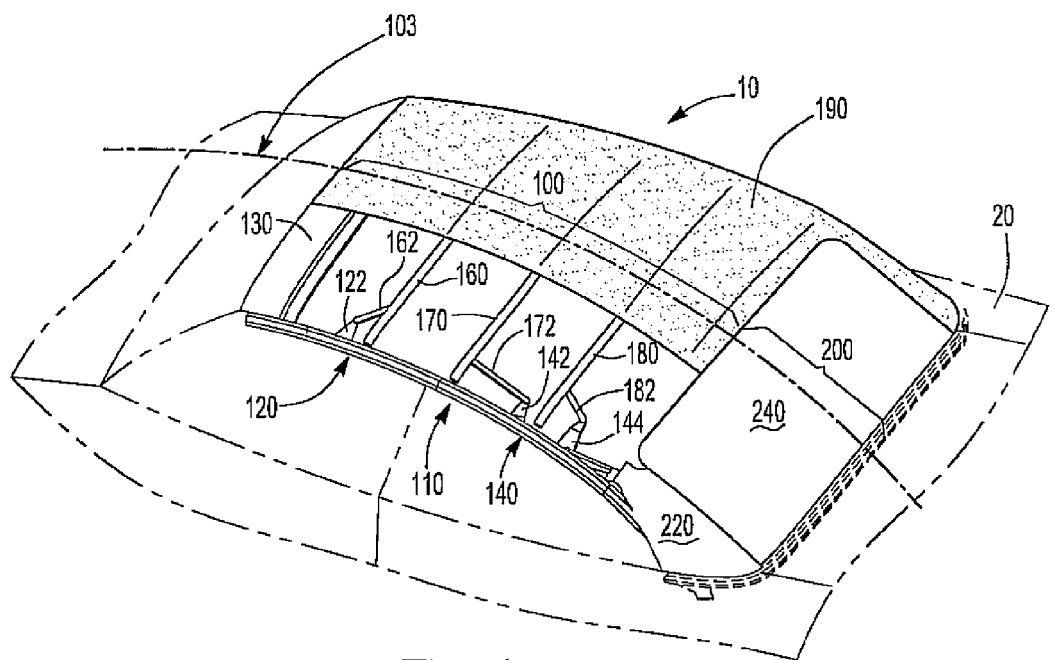
FIG. 1 is a top perspective view of a convertible soft top according to an embodiment of the present invention.

The present invention discloses a convertible soft top with in-folding side rails and a plurality of bows that afford for a compact and space efficient package when the top is stored in the retracted position. As such, the convertible soft top has utility as a roof component for a motor vehicle.

The convertible soft top can include a front portion and a rear portion. In some instances, the rear portion is a hard panel rear portion. The front portion can have a pair of in-folding side rails, each of the side rails being pivotally attached to a header element and to the rear portion. It is appreciated that the header element extends transversely with respect to a center line plane of the convertible soft top and the motor vehicle, the center line plane being a vertical plane that theoretically dissects the motor vehicle in a vertical direction along a centerline. The header element can attach to a frame that holds and/or secures a front window of the motor vehicle.

Each of the pair of in-folding side rails can have a front rail and a rear rail. The front rail has a front end that is pivotally attached to the header element and a rear end that is pivotally attached to the rear rail. The rear rail has a front end that is pivotally attached to the front rail and a rear end that is pivotally attached to the rear portion. The rear end of the front rail can be pivotally attached to the front end of the rear rail with an in-folding pivot joint. The in-folding pivot joint affords for the adjacent ends of the front rail and the rear rail attached to each other by the in-folding pivot joint to move towards the center line plane and thus results in the length of the front portion being reduced. As such, the front rail and the rear rail of each in-folding side rail are operable to fold inwardly towards a center line plane of the convertible soft top. The in-fold pivot joint or axis is generally normal to a ground plane, or stated differently, is generally parallel to the center line plane.

The front portion can also have a plurality of bows that are generally parallel to each other and pivotally attached to the pair of in-folding side rails. In some instances, the plurality of bows is at least three bows. The plurality of bows have a maximum distance between each bow when the convertible soft top is in the extended position and a minimum distance between each bow when the convertible soft top is in the retracted position. In addition, the plurality of bows remain generally parallel to each other while in the extend position, retracted position and during movement therebetween. Also included is a fabric cover that extends across and is attached to the plurality of bows. It is appreciated that the fabric cover attached to the plurality of bows stabilizes the movement of the convertible soft top and can assist the bows in staying generally parallel to each other when moving between the extend position and the retracted position.

The rear portion can have a four bar linkage and a connecting link between the four bar linkage and the front portion. In this manner, the front portion can extend and retract in a generally horizontal planar configuration and thus requires only one three-dimensional link for operation of the convertible soft top. The generally horizontal planar configuration of the extending or retracting front portion allows for generally vertical pivot joints to be used between the in-folding side rails and the plurality of bows, the header element and/or the rear portion.

The four bar linkage is operable to rotate the rear portion from the extended position to the retracted position, the rear portion in the retracted position forming a bottom portion of the clamshell configuration. In some instances, the four bar linkage is a perfect four bar linkage and thereby affords for an optional support link to be added to the linkage. It is appreciated that a perfect four bar linkage is known to those skilled in the art to have opposing links that parallel with each other. In addition, a perfect four bar linkage affords for rotation of the linkage and an attached structure to angles of greater than 180°. A perfect four bar linkage also allows for an additional link to be added to the linkage, for example an additional support bar.

In some instances, the plurality of bows can include a forward bow, a middle bow and a rearward bow. The forward bow can be pivotally attached to each of the front rails of the pair of in-folding side rails, and the middle bow and the rearward bow pivotally attached to each of the rear rails. As the in-folding side rails fold inwardly towards the center line plane, the plurality of bows that are generally parallel to each other move closer in distance towards each other while remaining generally parallel. Likewise, the header element moves closer in distance towards the plurality of bows and the rear portion. In this manner, the front portion can be compacted or compressed such that it fits on top of the rear portion when stored in the clamshell configuration.

It is appreciated that a clamshell configuration is known to those skilled in the art and refers to an inner surface of the top portion facing and being adjacent to an inner surface of the rear portion, the rear portion forming a figurative bottom half of a clam shell and the front portion forming a top half of the clam shell. Stated differently, the front portion and the rear portion each have an outer surface and an inner surface. In the clam shell configuration, the front portion is located generally on top of the rear portion with the front portion outer surface facing upwardly and the front portion inner surface facing downwardly towards the rear portion inner surface. The rear portion outer surface faces downwardly.

Turning now to FIGS. 1-7, an embodiment of the convertible soft top is shown generally at reference numeral 10. The convertible soft top 10 can be attached to a motor vehicle 20 and include a front portion 100 and a rear portion 200. The front portion 100 can include a center line plane 103 which can also serve as a center line plane for the motor vehicle. It is appreciated that the convertible soft top 10 is symmetrical about the center line plane 103 and thus only a portion of the top 10 may be shown in the figures with the understanding that it is mirrored on the opposite side of the axis 103.

Extending transversely relative to the center line plane 103 is a header element 130 and at least three bows 160, 170 and 180. Extending laterally with the axis 103 is a pair of in-folding side rails 110, each in-folding side rail 110 having a front rail 120 and a rear rail 140. Each of the at least three bows 160, 170 and 180 is pivotally attached to the in-folding side rail 110. In some instances, the at least three bows can be referred to as a forward bow 160, a middle bow 170 and a rear bow 180. The forward bow 160 can be pivotally attached to the front rail 120, for example by using a front rail bracket 122 and a front bow link 162. In addition, the middle bow 170 can be pivotally attached to the rear rail 140 using a first rear rail bracket 142 and a middle bow link 172, and the rear bow 180 can be pivotally attached to the rear rail 140 using a second rear rail bracket 144 and a rear bow link 182. A fabric cover 190 extends across the front portion 100 and is attached to one or more of the at least three bows. The fabric cover 190 can serve to stabilize the movement of the convertible soft top 10 and assist the at least three bows in staying generally parallel to each other when the top 10 moves between the extend position and the retracted position.

The rear portion 200 can include a hard rear panel that has a pair of C pillar portions 220 and a back light portion 240. It is appreciated that the back light portion 240 can include a back light (not shown).

Figure 2:
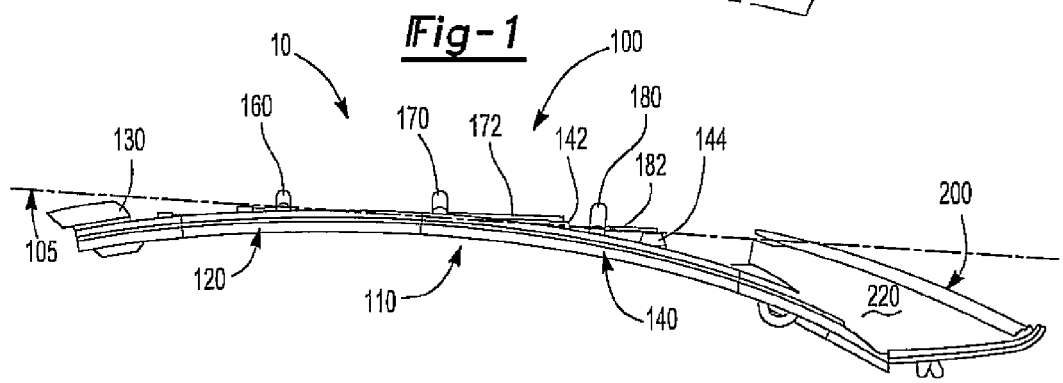
FIG. 2 is a side view of the embodiment shown in FIG. 1 illustrating the convertible soft top in an extended position.

Looking specifically at FIG. 2, a side view of the convertible soft top 10 in the extended position, without the fabric cover 190, is shown. In this position, it is appreciated that the in-folding side rails 110 are fully extended and the header element 130, forward bow 160, middle bow 170 and rear bow 180 are located apart from each other at a maximum distance.

Figure 3:
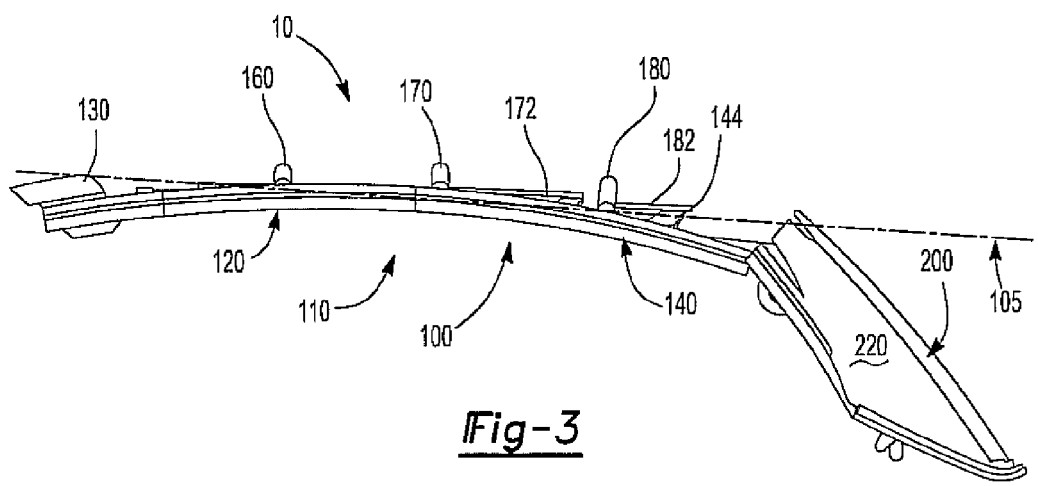
FIG. 3 is a side view of the embodiment shown in FIG. 2 illustrating the convertible soft top moving from the extended position towards a retracted position.
Figure 4:
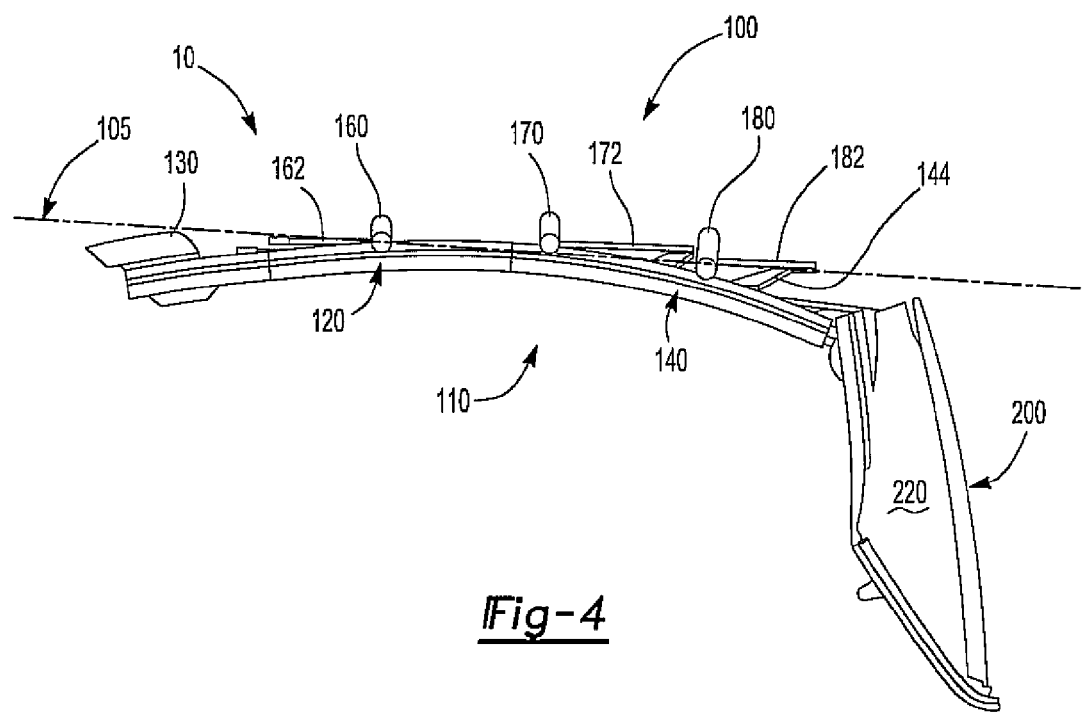
FIG. 4 is a side view of the embodiment shown in FIG. 3 illustrating the convertible soft top continuing to move towards the retracted position.
Figure 5:
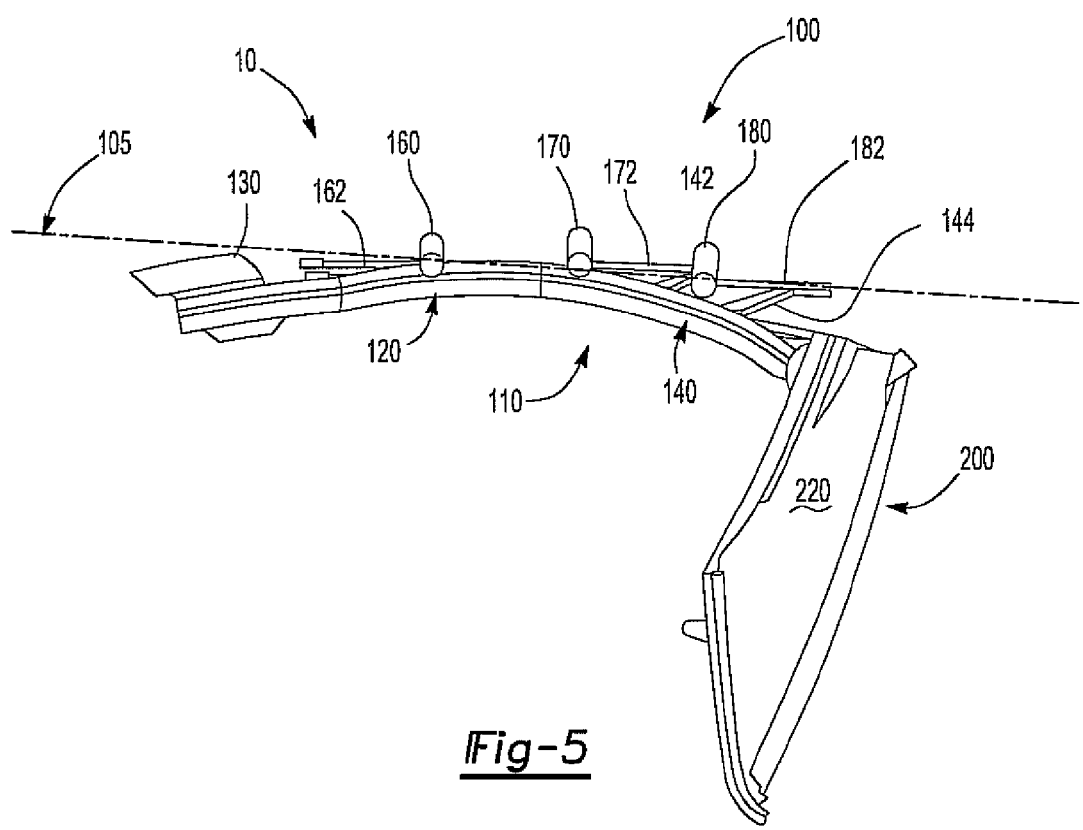
FIG. 5 is a side view of the embodiment shown in FIG. 4 illustrating the convertible soft top continuing to move towards the retracted position.
Figure 6:
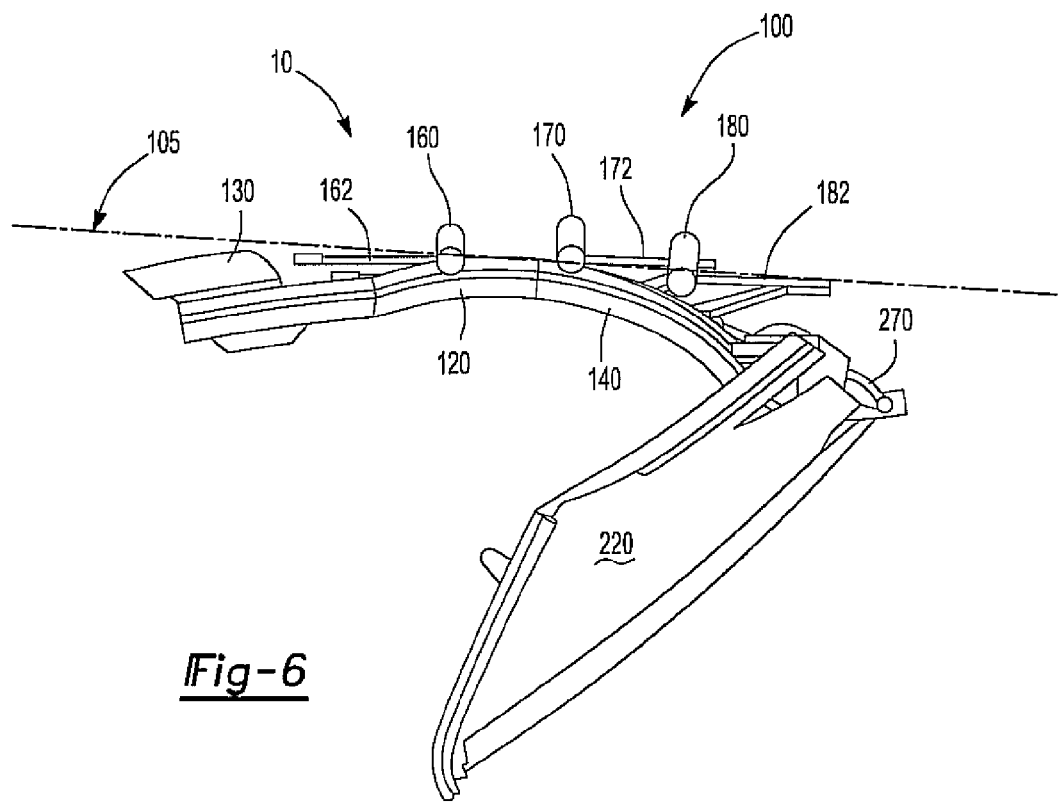
FIG. 6 is a side view of the embodiment shown in FIG. 5 illustrating the convertible soft top continuing to move towards the retracted position.

Looking specifically at FIG. 3, a side view of the convertible soft top 10 illustrates the rotation of the rear portion 200 in a clockwise direction and a decrease in the distance between the header element 130, forward bow 160, middle bow 170 and rear bow 180. It is appreciated that the clockwise direction of rotation is for illustrative purposes only when viewing FIG. 3 and that the rear portion can rotate clockwise or counter-clockwise depending on a view point.

Figure 7:
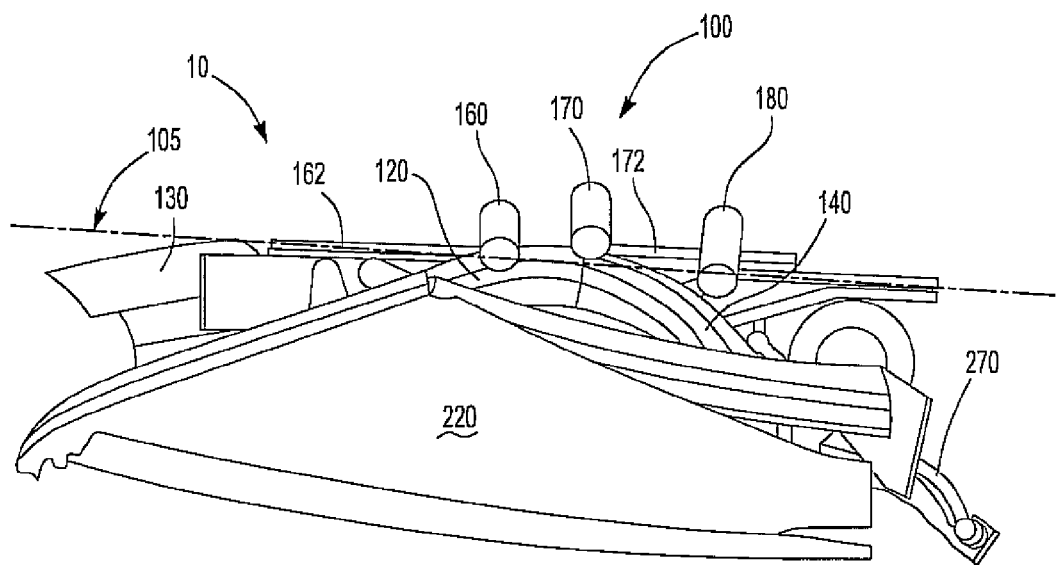
FIG. 7 is a side view of the embodiment shown in FIG. 6 illustrating the convertible soft top in the retracted position.

FIGS. 4-7 illustrate the continued progression of the convertible soft top 10 moving from the extended position to the retracted position. As shown in these figures, the rear portion 200 continues to rotate in a clockwise direction for a predetermined angle or rotation at which point the rear portion 200 is a bottom portion for the clamshell configuration. It is appreciated that the distances between the header element 130, forward bow 160, middle bow 170 and rear bow 180 continue to decrease until reaching a minimum distance therebetween when in the retracted position as shown in FIG. 7. In this manner, the in-folding side rails 110 afford for a compact and space efficient package as shown in FIG. 7 that can be stored behind a passenger compartment of the motor vehicle. In addition, FIGS. 1-7 illustrate that the front portion 100 moves from the extended position to the retracted position, and vice versa, in a generally horizontal planar configuration as illustrated by the plane 105. In this manner, generally vertical pivot joints, to be described later, can be used to pivotally attach the in-folding side rails 110 to the bows 160, 170, 180, the header element 130 and a bracket 150.

Figure 8:
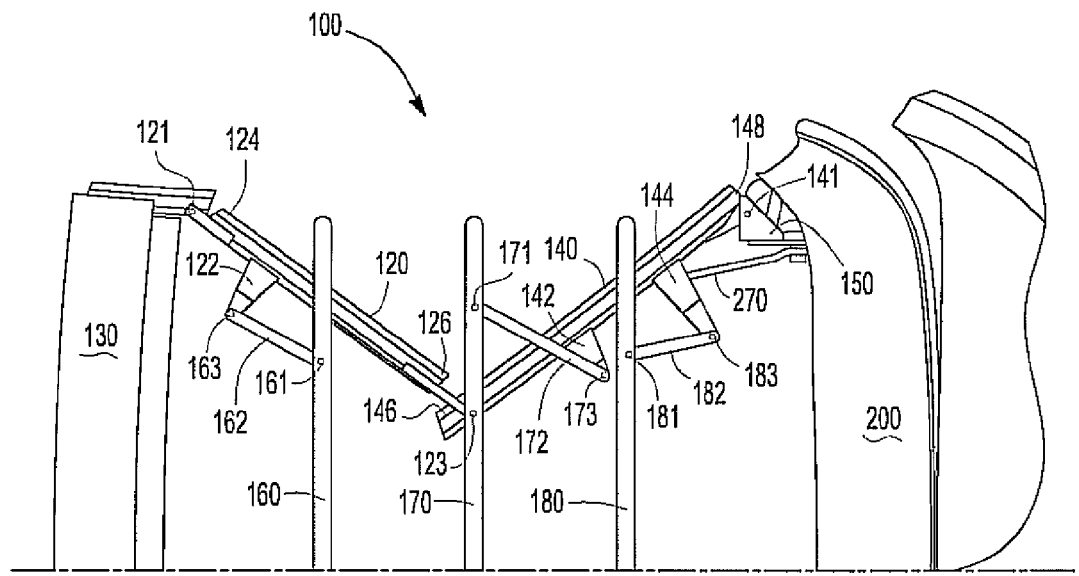
FIG. 8 is a top perspective of the embodiment shown in FIG. 4 illustrating the convertible soft top in a position between the extend position and the retracted position.
Figure 9:
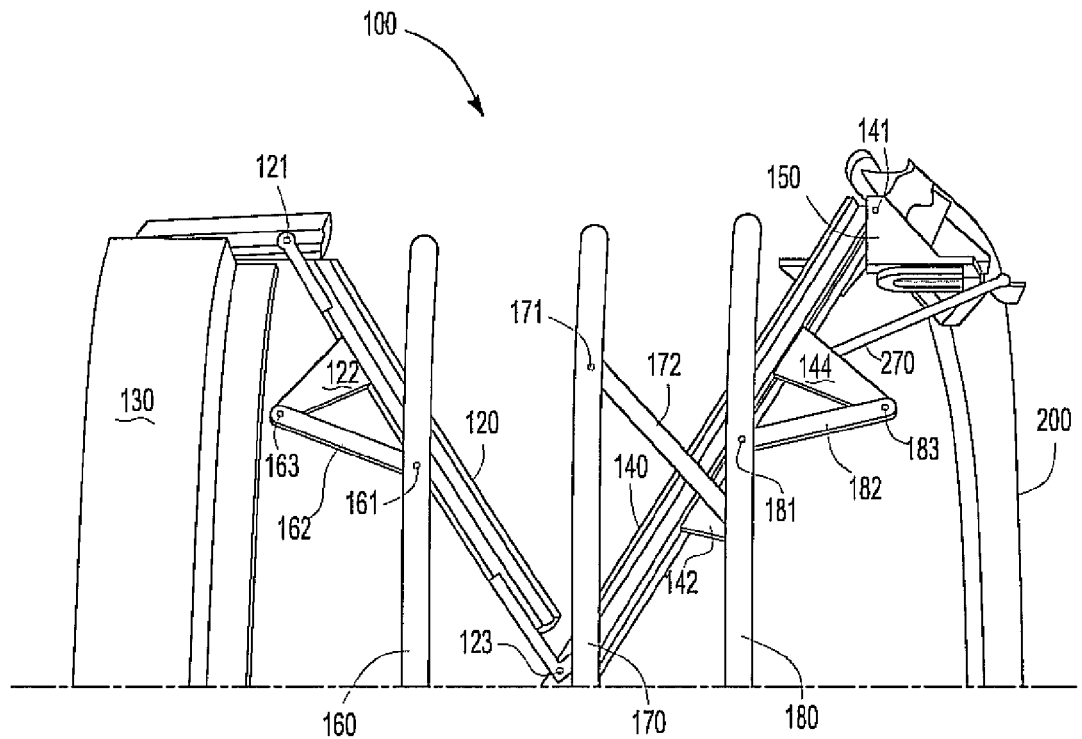
FIG. 9 is top perspective of the embodiment shown in FIG. 8 illustrating the convertible soft top moving towards the retracted position.
Figure 10:
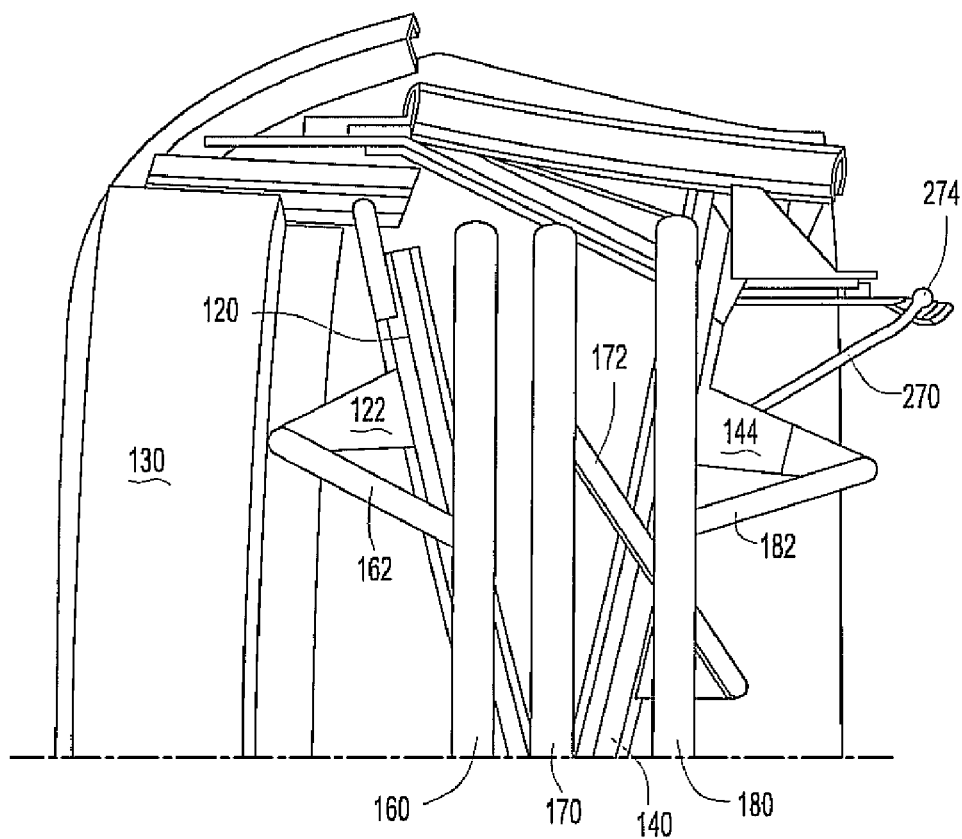
FIG. 10 is top perspective of the embodiment shown in FIG. 8 illustrating the convertible soft top in the retracted position.

Turning now to FIGS. 8-10, a top view of the convertible soft top 10 moving from the extended position to the retracted position is shown. In particular, FIGS. 8 and 9 illustrate that the front rail 120 can have a front end 124 that is pivotally attached to the header element 130 and a rear end 126 pivotally attached to a front end 146 of the rear rail 140 at a generally vertical axis in-folding joint 123. As known to hose skilled in the art, the joint 123 can be replaced with a four-bar linkage. In addition, the rear rail 140 can have a rear end 148 that is pivotally attached to the rear portion 200 using a generally vertical pivot joint 141 and the bracket 150. The bracket 150 can provide a link between the front portion 100 and the rear portion 200. The in-folding pivot joint 123 affords for the adjacent ends 126, 146 of the front rail 120 and the rear rail 140, respectively, to move towards the center line plane 103 and thus result in the length of the front portion 100 being reduced. As such, the front rail 120 and the rear rail 140 of each in-folding side rail are operable to fold inwardly towards the center line plane 103 of the convertible soft top 10.

The generally horizontal planar movement of the front portion 100 affords for the use of the generally vertical pivot joints. As such, the front bow 160 is pivotally couple to the front rail 120 using a generally vertical pivot joint 161 between the front bow 160 and a front bow link 162, and a generally vertical pivot joint 163 between the front bow link 162 and a front rail bracket 122. It is appreciated that the front rail bracket 122 and the front bow link 162 afford for the front bow 160 to maintain its generally parallel relationship with the header element 130 as the in-folding side rails 110 fold inwardly.

Regarding the middle bow 170 and the rear bow 180, the middle bow 170 is pivotally coupled to the rear rail 140 using a generally vertical pivot joint 171 between the middle bow 170 and a middle bow link 172, and a generally vertical pivot joint 173 between the middle bow link 172 and a first rear rail bracket 142. It is appreciated that the middle bow 170 and/or rear bow 180 could be pivotally coupled to the front rail 120. Likewise, the rear bow 180 is pivotally coupled to the rear rail 140 using a generally vertical pivot joint 181 between the rear bow 180 and a rear bow link 182, and a generally vertical pivot joint 183 between the middle bow link 182 and a second rear rail bracket 144. In this manner, a generally planar folding mechanism without the need of a three dimensional joint is provided for the front portion 100.

Figure 11:
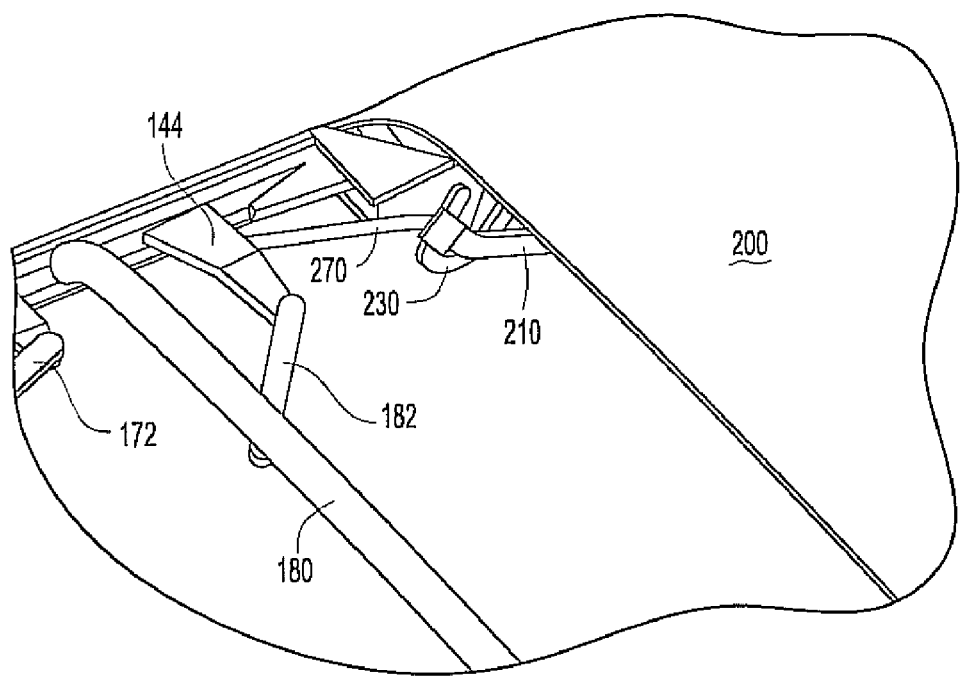
FIG. 11 is a top perspective view illustrating a connection between a front portion and a rear portion of the convertible soft top.
Figure 12:
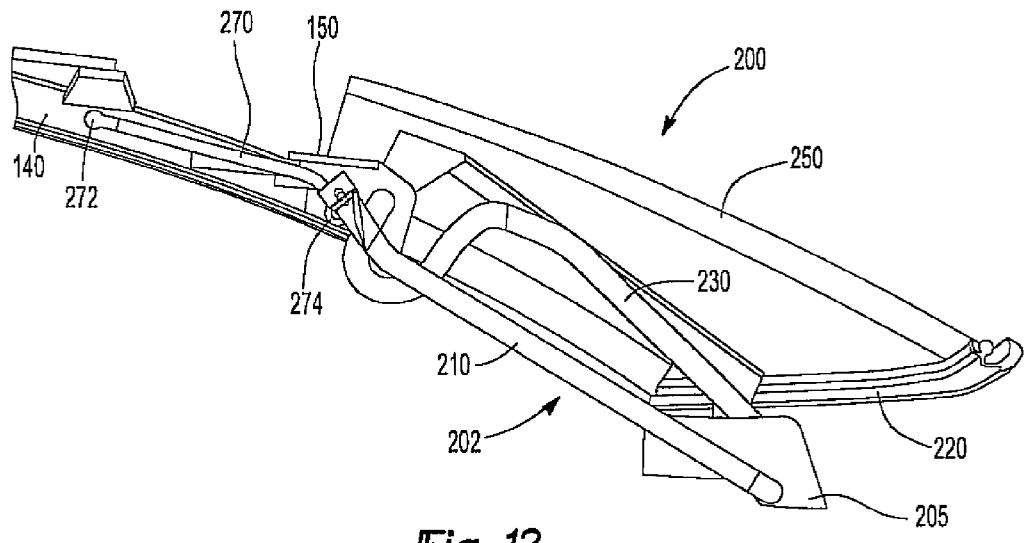
FIG. 12 is a side view of a four bar linkage of the convertible soft top.

Looking now at FIGS. 11 and 12, a connection link 270 between the rear portion 200 and the front portion 100 is shown. The rear portion 200 can include a four bar linkage 202 that is secured to the motor vehicle through a base 205. The four bar linkage 202 can include a first bar 210 and a second bar 250, the bracket 150 and the base 205. The second bar 250 may or may not be integral with the C pillar portions 220. In some instances, the four bar linkage 202 is a perfect four bar linkage and thus can further include an additional support bar 230 that can be parallel to a longest bar of the four bar linkage 202 as shown in FIG. 12. Establishing a mechanical connection between the four bar linkage 202 and the front portion 100 is the connection link 270. The connection link 270 is attached to the rear rail 140 using a three-dimensional joint 272. In some instances, the three-dimensional joint 272 can be a ball-socket type joint. The connection link 270 is also attached to the four bar linkage 202 using a joint 274. In some instances, the joint 274 can be a universal type joint or a ball-socket type joint. In this manner, the link 270 provides a link with three degrees of motion between the rear portion 200 and the front portion 100.

It is appreciated that the base 205 can be attached to the motor vehicle and that an electronic, pneumatic or other power system can be used to exert force on the four bar linkage 202 and thus the connection link 270. In this manner, the connection link 270 can be used to pull and/or push upon the rear rail 140 and thus result in the front portion 100 moving from the extended position to the retracted position, and vice versa. In addition, it is also appreciated that the additional support bar 230 can be used to support the front portion 100 as it moves from the extended position to the retracted position, and vice versa, and the four bar linkage 202 can rotate the rear portion 200 from the extended position to the retracted position such that the rear portion 200 forms a bottom portion of the clam shell configuration.

It is appreciated that the front portion 100 and the rear portion 200, excluding the fabric cover 190, can be made from any material known to those skilled in the art, illustratively including metals, alloys, plastics, ceramics, wood and the like. In addition, the fabric cover 190 can be made from any flexible fabric material suitable for a convertible soft top that is known to those skilled in the art, illustratively including materials made from plastics, cloth, combinations thereof and the like.

The foregoing drawings, discussion and description are illustrative of specific embodiments but they are not meant to be limitations upon the practice thereof. Numerous modifications and variations of the invention will be readily apparent to those of skill in the art in view of the teaching presented herein. It is the following claims, including all equivalents, which define the scope of the invention.

I claim:

1. A convertible soft top for a motor vehicle, said convertible soft top comprising:
    said convertible soft top attached to the motor vehicle, said convertible soft top having an extended position and a retracted position, said convertible soft top also having:
    a front portion and a rear portion;
    said front portion having a header element and a pair of in-folding side rails, each of said pair of in-folding side rails pivotally attached to said header element and said rear portion;
    said front portion also having plurality of bows that are generally parallel to each other and pivotally attached to said pair of in-folding side rails;
    said front portion also having a fabric cover extending thereacross;
    said front portion and said rear portion operable to fold into a clamshell configuration with said front portion located on top of said rear portion and said pair of in-folding side rails and said plurality of bows operable to fold inwardly in a generally horizontal planar configuration.

2. The convertible soft top of claim 1, wherein said pair of in-folding side rails and said plurality of bows are pivotally attached with generally vertical pivot joints.

3. The convertible soft top of claim 2, wherein said pair of in-folding side rails, said plurality of bows and said fabric cover are operable to fold such that a distance between said plurality of bows decreases when said convertible top is moved from said extended position to said retracted position and said plurality of bows remain parallel to each other.

4. The convertible soft top of claim 1, wherein:
said pair of in-folding side rails each have a front rail and a rear rail;
said front rail having a front end pivotally attached to said header element and a rear end pivotally attached to said rear rail; and
said rear rail having a front end pivotally attached to said rear end of said front rail and a rear end pivotally attached to said rear portion.

5. The convertible soft top of claim 1, wherein said rear portion has a four bar linkage and a connecting link between said four bar linkage and said front portion.

6. The convertible soft top of claim 5, wherein said four bar linkage is a perfect four bar linkage.

7. The convertible soft top of claim 6, further comprising an additional support bar attached to said four bar linkage, said additional support bar operable to support said front portion.

8. The convertible soft top of claim 1, wherein said plurality of bows include a forward bow, a middle bow and a rearward bow.

9. The convertible soft top of claim 8, wherein said forward bow is pivotally attached to each said front rail of said pair of in-folding side rails, and said middle bow and said rearward bow are pivotally attached to each said rear rail.

10. The convertible soft top of claim 5, wherein said four bar linkage is operable to rotate said rear portion from said extended position to said retracted position, said rear portion in said retracted position forming a bottom portion of said clamshell configuration.

11. The convertible soft top of claim 7, wherein said additional support bar is generally parallel to a longest bar of said perfect four bar linkage.

12. The convertible soft top convertible of claim 11, wherein said additional support link supports said front portion during movement from said extended position to said retracted position and movement from said retracted position to said extended position.

* * * * *